United States Patent Office 3,708,463
Patented Jan. 2, 1973

3,708,463
PROCESS FOR PREPARING VINYLIDENE
FLUORIDE POLYMERS FOR COATING
APPLICATIONS
John P. Stallings, Mentor, Ohio, assignor to Diamond Shamrock Corporation, Cleveland, Ohio
No Drawing. Filed Mar. 18, 1971, Ser. No. 125,851
Int. Cl. C08f 3/22
U.S. Cl. 260—92.1
8 Claims

ABSTRACT OF THE DISCLOSURE

Vinylidene fluoride polymers having particular utility for dispersion coating application are prepared in an aqueous medium in the presence of a fluorinated surfactant, a lower alkylene oxide, and, as the free-radical initiator, β-hydroxyethyl tertiary butyl peroxide, while a pressure of at least 1500 p.s.i.g. is maintained on the reaction by continuously applying hydrostatic pressure. Substantial yields, i.e., at least 85% conversion, of polymer product are produced in polymerization run times of 0.5 hour to about 6 hours with minimum reactor fouling.

BACKGROUND OF THE INVENTION (1) Field of the invention

This invention relates to useful, easily processed vinylidene fluoride polymers, i.e., poly(vinylidene fluorides) which may be particularly adapted for the production of smooth, tough coatings on a wide variety of substrates. More particularly, this invention relates to an aqueous emulsion polymerization process for producing improved dispersion-grade vinylidene fluoride polymers.

(2) Description of the prior art

It has long been known that vinylidene fluoride can be polymerized to high molecular weight polymers in aqueous media under extremely high pressures and in the presence of peroxy compounds as initiators. In U.S. Pat. 2,435,537, for example, the use of both inorganic peroxy compounds such as potassium persulfate and organic peroxides such as acetyl peroxide and dibenzoyl peroxide is described. Of these two specified types of initiators, the organic peroxides generally provide better quality polymers, although effecting only relatively low yields thereof, e.g., from 10% to 20% conversions, even at extremely high pressures.

U.S. Pat. 3,193,539 describes the use of a certain organic peroxide initiator, namely, ditertiary butyl peroxide, in an aqueous process for vinylidene fluoride polymerizations. This initiator, which is a monomer-soluble type compound, provides excellent yields of polymer product at moderate pressures, i.e., in the range of 300 to 1000 p.s.i.g., although reaction temperatures of 120°–130° C. and reaction times of around 20 hours are required. Additionally, a fluorinated surfactant optionally may be included in the process as taught by U.S. Pat. 3,193,539, whereby a vinylidene fluoride polymer product of extremely fine average particle size and good thermal stability is recovered.

U.S. Pat. 3,012,021 describes the use in an aqueous polymerization process of an alkylene oxide, such as ethylene oxide in combination with a catalyst such as the aforementioned ditertiary butyl peroxide in order to reclaim good practical yields of vinylidene fluoride polymer product in the form of a free-flowing powder rather than a hard brittle polymer mass.

In U.S. Pat. 3,475,396, there is proposed an improved process for producing poly(vinylidene fluoride) in excellent yields with moderate reaction pressures and much shorter reaction times than previously possible. This process utilizes, as initiator, diisopropyl peroxydicarbonate, which like the aforementioned ditertiary butyl peroxide, is a monomer-soluble material.

Further in the prior art, U.S. Pat. 3,245,971 reputedly provides the only practicable process for polymerizing vinylidene fluoride in the presence of water-soluble organic peroxide initiators rather than monomer-soluble types. Specifically, the water-soluble peroxides utilized are a class of dibasic acid peroxides within which the particular species, disuccinic acid peroxide, is especially preferred. In this process, however, a fluorinated surfactant as previously described and an iron powder must each be incorporated in prescribed amounts in the polymerization system in addition to the aforementioned initiator to effect any production of vinylidene fluoride polymer. Nonetheless, even with the optimum system, reaction times of 17 to 21 hours are required to produce even moderate yields of polymer product.

In my copending U.S. patent application, Ser. No. 215,938, filed on Jan. 6, 1972, which is a continuation-in-part of application Ser. No. 887,754, filed on Dec. 23, 1969, now abandoned, an improved process is described for polymerizing vinylidene fluoride in aqueous suspension, which process employs hydrostatic pressure excessive of the monomer pressure on the reaction. The hydrostatic pressure exerted is sufficient to maintain completely liquid-full reactor conditions. This process, which utilizes a monomer-soluble free-radical initiator, is capable of producing optimum yields of polymer product with distinctive properties in minimum reaction times, while requiring much reduced concentrations of initiator than employed previously in the art.

I have now found that excellent yields of vinylidene fluoride polymer likewise may be obtained in minimum reaction times from an aqueous emulsion (or dispersion) polymerization process by employing as the free-radical polymerization initiator, a particular water-soluble organic peroxide, namely, β-hydroxyethyl tertiary butyl peroxide. Also, I have found that for optimum results, e.g., most efficient polymerization rates, minimum build-up of polymer product in the reactor and most desirable polymer product, it is necessary to also incorporate in the polymerization system a minor quantity each of a lower alkylene oxide and a fluorinated surfactant and to maintain sufficient pressure on the polymerizaiton system by the application of hydrostatic pressure in excess of the monomer pressure, so that substantially liquid-full reactor conditions are sustained throughout the process.

SUMMARY OF THE INVENTION

Accordingly, the present invention comprises polymerizing vinylidene fluoride in an aqueous medium in the presence of (a) β-hydroxyethyl tertiary butyl peroxide; (b) a lower alkylene oxide; and (c) a water-soluble fluorinated surfactant, while sustaining an operating pressure of at least 1500 p.s.i.g. on the reaction by continuously applying hydrostatic pressure in excess of the monomer pressure. With this process, excellent yields of high-quality polymer product are obtained generally in from 0.5 to 6 hours run time, with insignificant, if any, build-up of solid polymer on the reactor walls. Such undesirable polymer accumulation is commonly designated in the art as "reactor fouling."

The vinylidene fluoride polymer products obtained exhibit excellent physical and chemical properties. They may be particularly adapted for application as dispersion coating resins, providing on a wide variety of substrates, continuous, durable coatings characterized by excellent smoothness and gloss.

A particular advantage of the process of this invention is that it provides an economical, commercially-feasible method for polymerizing vinylidene fluoride via an aqueous emulsion technique, utilizing a water-soluble, rather than a monomer-soluble organic peroxide initiator.

DESCRIPTION OF THE PREFERRED EMBODIMENTS

The water-soluble organic peroxide initiator utilized in the process of this invention, β-hydroxyethyl tertiary butyl peroxide, has the structural formula:

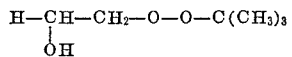

It may be prepared by condensing ethylene oxide with tertiary butyl hydroperoxide as described, for example, in U.S. Pat. No. 2,605,291.

As described previously, the polymerization system herein necessarily requires, in addition to the particular initiator, minor quantities of a lower alkylene oxide and a fluorinated surfactant.

A lower alkylene oxide is essentially utilized in the polymerization system as an aid in effecting optimum yields of polymer in minimum reaction times. That use of such a compound is beneficial herein is indeed surprising since it has been taught heretofore in the art, e.g., in U.S. Pat. 3,012,021, that the use of an alkylene oxide in combination with an hydroxyl group-containing initiator, such as employed herein, effects homopolymerization of the alkylene oxide "in situ." Such alkylene oxide polymerization, in turn, has appeared heretofore to retard the efficiency of the initiator, so that lower yields of polymer product typically have been obtained even with long polymerization run times.

In addition to its beneficial effect on the overall polymerization rate, use of the alkylene oxide is found to aid in minimizing reactor fouling.

It is to be noted that in contrast to prior teachings, the alkylene oxide does not appear to exercise any molecular weight-regulating effect on the polymer product, i.e., it does not act as a chain transfer agent herein. Accordingly, polymers made either in the presence or absence of the alkylene oxide do not vary in average molecular weight to any significant degree. Of course, runs made without the alkylene oxide evidence bad reactor fouling, etc., as previously described.

The lower alkylene oxides employed are those having not more than about 8 carbons in the molecule, e.g., ethylene oxide, propylene oxide, isobutylene oxide, etc. Of these, ethylene oxide is presently preferred.

Generally, from about 0.02% to about 0.5% of alkylene oxide, based on the weight of monomer, is effective for providing the reduced reactor fouling desired. On a molar basis, such quantities are equivalent to from about 1/5000 to about 3/400 of a mole of alkylene oxide per mole of vinylidene fluoride. Actually, greater proportions of the alkylene oxide could be used with no detrimental affect on the system, but there is no practical purpose in employing more than the quantities stated. In practice, the alkylene oxide usually is added to the polymerization system in dilute aqueous solution.

As described previously, the aqueous polymerization system herein also necessarily utilizes a small quantity of a fluorinated surfactant. Although this material may, in conjunction with the lower alkylene oxide, likewise contribute to the production of optimum polymer yields, its primary function is to afford a true emulsion polymerization system from which polymer products of an average particle size desirable in dispersion coating application can be obtained. Fluorinated surfactants which may be suitably utilized herein have already been described heretofore, e.g., in the aforementioned U.S. Pat. Nos. 3,193,539; 3,475,396 and 3,245,971. In principle, any water-soluble fluorinated or fluorochlorinated surfactant may be employed herein provided the hydrophobic portion thereof is at least half-fluorinated and contains from 5 to 15 carbon atoms; and the hydrophilic portion thereof is ionic in nature and exhibits water-solubilizing character, e.g., a carboxyl, phosphate, amine, sulfonic acid or water-soluble sulfonic acid salt group. For practical application, however, the surfactants most advantageously employed are perfluorinated types which conform to the general formula X(R)—Y, where X may be hydrogen, fluorine or chlorine; R is a perfluoroalkylene, perfluorocycloalkylene or perfluorochloroalkylene radical having from about 6 to about 20 carbon atoms, preferably 8 to about 15 carbon atoms; and Y is an ionic hydrophilic group. As a class, these surfactants include the perfluorocarboxylic acids or their water soluble salts, such as, e.g., perfluorooctanoic, perfluorononanoic or perfluorodecanoic acid and the alkali metal and ammonium salts thereof.

The quantity of surfactant effectively employed herein ranges generally from 0.1 to 1.5%, preferably from 0.5 to 1.0%, by weight of the monomer.

In addition to the essential alkylene oxide and surfactant components, a chain transfer agent optionally may be included in the polymerization system herein. As well known in the art, a chain transfer agent is employed when it is desired to prepare polymer products of lower average molecular weight than can be obtained from similar polymerization systems not incorporating a chain transfer agent. Use of a chain transfer agent in the process surprisingly does not appear to retard or otherwise inhibit the efficiency of the β-hydroxyethyl tertiary butyl peroxide initiator, since the rate of polymerization is not arrested appreciably in any way, by comparison to runs wherein no chain transfer agent is employed.

This fact is in direct contrast to the rate inhibition observed in like processes wherein a chain transfer agent is employed in combination with other monomer-soluble and water-soluble peroxides already known and used for vinylidene fluoride polymerization. Examples of chain transfer agents which are suitable herein include lower aliphatic, i.e., $C_{1-8}$ alcohols, e.g., methanol, ethanol, isopropanol, isomeric butanols, etc.; lower aliphatic, i.e., $C_{1-8}$ ketone, such as acetone, methyl ethyl ketone, etc.; and halogenated, e.g., chlorinated or brominated aliphatic hydrocarbons, such as trichloroethylene, dichloroethylene, chloroform, etc., as well as mixed analogs thereof, which may also contain fluorine substitution. Of these, isopropanol is preferred at present. An amount of chain transfer agent ranging from 0.05% to 5%, by weight of monomer, generally may be used.

As set forth previously, the aqueous polymerization process of this invention in general can be carried out in about 0.5 to 6 hours; at reaction pressures ranging from abount 1500 to 5000 p.s.i.g. and at reaction temperatures of 80° to 110° C. Preferably at present, the process is effectively conducted in a reaction time of 1 to 5 hours, at a temperature of 90°–105° C. and at an operating pressure of approximately 2000 p.s.i.g., as maintained on the system through application of additional hydrostatic pressure.

The amount of the β-hydroxyethyl tertiary butyl peroxide initiator employed under the stated reaction conditions ranges generally from about 0.2 to about 3%, on a totally active basis, more preferably from about 0.50 to 2.0%, and most preferably from about 0.5 to 1.5%, by weight of the total quantity of monomer employed in a given run. The initiator which is a liquid under normal conditions generally may be introduced into the polymerization system as is or, alternatively, as a solution in an organic liquid compatible, i.e., soluble, dispersible, or miscible therewith. Such liquids can be either aliphatic or aromatic hydrocarbons, e.g. cyclohexane, heptane, petroleum naphtha, benzene, toluene or xylene; esters, ethers or chlorinated hydrocarbons.

In carrying out the polymerization generally, an aqueous medium such as deoxygenated, deionized water is charged to the reactor maintained at ambient temperature, together with the β-hydroxyethyl tertiary butyl peroxide, the alkylene oxide, the surfactant and optionally a chain transfer agent. The reactor is sealed and purged or swept out with an inert gas such as nitrogen. It is charged with vinylidene fluoride under superatmospheric pressure. A presently preferred method involves initially charging only the water to the reactor, followed by purging and then pumping the various components successively into the evacuated reactor. After charging is completed by either method, the temperature of the reaction mixture is raised in about 30–60 minutes to the desired polymerization temperature. A pressure of at least 1500 p.s.i.g. is typically maintained on the reaction. Throughout the process, the reactor contents are preferably agitated by appropriate internal agitation means.

After polymerization is completed, the polymer product recovered from the reactor is in the form of a dispersion or latex wherein the ultimate particle particles are essentially colloidal in size, e.g., from 0.05 to about 1 micron in diameter. This polymer dispersion may then be coagulated by any of the known methods in the art to obtain the polymer as a free-flowing powder.

Depending upon whether or not a chain transfer agent has been included in the polymerization reaction, or alternatively how much chain transfer agent has been used, the finished polymer products may vary widely in average polymer molecular weight. Variations in molecular weight are indicated herein by the different flow rates exhibited by the polymers when in a melted state, said flow rates being designated as polymer "melt flow index" numbers. These values are determined herein according to the ASTM Procedure, D 1238–65T (Method A), which procedure covers measurement of the rate of extrusion of molten resins through an orifice of a specified length and diameter under prescribed temperature and pressure conditions. In practice, this test is conducted using a plastometer having dimensions as specified in the test method, at a test temperature of 265° C., a combined load of 12,500 g. and a pressure of 250 p.s.i. Using this procedure, polymer products of this invention are found to exhibit melt flow index numbers (MFI) ranging from about 5 to 61 or above. For optimum performance in dispersion coating applications, polymer products preferably should exhibit MFI's of 20–25.

The process of this invention produces vinylidene fluoride polymers essentially of colloidal average particle size with monodisperse distribution. The polymer particles are relatively nonporous, well adapted to the preparation of dispersions of high solids content in pseudosolvents such as dimethylformamide, $\gamma$-butyrolactone and the like. Such solvents are also known and designated in the fluorocarbon polymer coating art as "latent solvents."

The polymer products of this invention provide on a wide variety of substrates uniform, tough, adherent coatings of high gloss, excellent thermal stability, and chemical resistance and good post-deformability, i.e., the coatings can be bent, punched or otherwise deformed without cracking or delaminating from the substrate.

In addition to their particular application as coating materials, the polymers of this invention may, of course, be molded by various techniques, e.g., by extrusion, injection molding, etc., to produce various finished plastic shapes. For such application, polymer products are preferred which generally have been prepared without utilizing any significant amount of chain transfer agent, if any.

In order that those skilled in the art may more completely understand the present invention and the preferred methods by which the same may be carried out, the following specific examples are offered. It is to be understood, however, that these examples are given for purposes of illustration and are not to be taken as in any way restricting the invention beyond the scope of the appended claims. In these examples, where proportions of ingredients may be given in parts, such parts are by weight.

Example 1

A one-gallon stainless steel autoclave is charged successively at room temperature with 1000 parts of deoxygenated, deionized water, 10 parts of a 75% solution of $\beta$-hydroxyethyl tertiary butyl peroxide in mineral spirits (7.5 g. initiator), 8.5 parts ammonium perfluorooctanoate and 42 ml. aqueous ethylene oxide (1% solution). The autoclave is then closed, evacuated and charged with 908 parts of vinylidene fluoride monomer. With agitation, the reaction mixture is then heated rapidly to 100° C. (in about 50 minutes), while about 1000 ml. of water is pumped into the reactor to effect substantially liquid-full conditions therein (about 2000 p.s.i.g. pressure). After the polymerization conditions are reached, the reaction is continued for 2½ hours, while approximately 1140 parts additional $H_2O$ is pumped into the reactor to sustain the operating pressure.

After polymerization, the autoclave is cooled, vented and opened. Polymer build-up in the reactor is negligible. The latex is removed and the polymer product is isolated by freeze-coagulation of the latex. The product is separated by filtration, washed with water and finally dried at 50° C. under vacuum. The dried polymer recovered weighs 825 g. (over 90% monomer conversion). It has an MFI number of 12, a particle size distribution ranging broadly from 0.2 to 2.4 microns, with the average particle size of at least 85% of the polymer being $0.5\mu$.

To determine the performance of this polymer product in coating applications, a dispersion is prepared by first making a pigment slurry and solvent solution, blending these components and then incrementally adding the polymer to this mixture. The dispersion is then ground in a ball mill for 4 hours. The finished dispersion contains, by weight, 21 parts polymer, 9.5 parts titanium dioxide (R–960, E. I. du Pont), 7.5 parts of an acrylic copolymer (Rohm and Haas, B–44 resin), 1.2 parts of Zn dicyclohexyl dithiophosphinate and 60.8 parts of a solvent mixture composed of 40 parts of $\gamma$-butyrolactone and 60 parts of isophorone.

The degree of dispersion, i. e., the fineness of grind of the prepared pigmented coating formulation is measured according to ASTM Procedure D 1210–64, employing a Hegman Grind Gage. In the test, resin and/or pigment particles in the dispersion become visible at a gage reading, i.e., Hegman number, of over 5 (corresponds to a thickness of 1.0–1.5 mils for the drawdown film), indicating a finely ground dispersion.

The consistency of the dispersion is determined employing a Zahn G 5 viscosity cup, according to the method set forth on page 184 of the Gardner Paint Testing Manual, 12th edition, March 1962. The viscosity of the dispersion is 6 Zahn seconds, which low value indicates that the polymer product has a relatively nonporous particulate character.

The dispersion is applied to an unprimed 4" x 6" aluminum panel by means of a Baker Film Applicator adjusted to give a dry film thickness of about 1 mil. The coated panel is then exposed in an air-circulating oven for 90 seconds at 600° F. followed by water-quenching. The finished coating is a smooth continuous film completely homogeneous in appearance. Tests are then made concerning gloss and adhesion of the coating.

The Gardner gloss rating of the coating is measured in accordance with the attendant method of test for 60° two-parameter specular gloss, ASTM D 1471–69. The gloss meter employed is equipped with an automatic photometric unit, in combination with Model UX-3 60° gloss head manufactured by Henry A. Gardner Laboratory Corp., Bethesda, Md. By this method, the coating exhibits a Gardner gloss rating of 63 at 60°.

The adhesion test comprises scoring a one-inch square portion of the coated panel surface with intersecting score marks 1/16" apart (commonly designated as "cross-hatching" of the coating). The uncoated side of the panel opposite the cross-hatched area is then subjected to a reverse impact of 48 inch-pounds on a Gardner Reverse Impact Tester, according to ASTM D 2794–69. Scotch Tape No. 600 is pressed over the impacted, scored coating and then quickly removed. Adhesion failure is indicated by removal of any portion of the coating by the tape. If no portion of the coating is removed, adhesion is considered complete, corresponding to an Adhesion Number of 10. Using this procedure, the coating of this example has an Adhesion Number of 10.

For comparison purposes, a pigmented polymer dispersion is prepared as described above, employing, in place of a polymer product of this invention, a presently commercial poly(vinylidene fluoride) resin, Kynar 500, which is manufactured and sold by Pennwalt Corporation as a dispersion-grade resin. This resin exhibits an MFI of 3. While cured coatings of the Kynar 500 dispersion are found to be as adherent as those of the polymer products of this invention, the Kynar coatings exhibit a Gardner gloss rating of about 51 at 60° Also, the Kynar dispersion gives a Hegman Grind Number of about 2, indicating this resin to be of a much larger average particle size than the polymers of this invention.

Example 2

Another polymerization reaction is carried out as described in Example 1 above, employing 210 ml. rather than 42 ml. of the ethylene oxide aqueous solution. The finished product exhibits an MFI of 14, whereas the product of Example 1 exhibits an MFI of 12. Thus, in the process of this invention, ethylene oxide does not appear to act as a chain transfer agent to any significant degree.

Example 3

This example illustrates that use of a lower alkylene oxide, e.g., ethylene oxide, is necessary to minimize reactor fouling in the process of this invention.

Following the same general procedure and employing essentially the same recipe as outlined in Example 1 above, a polymerization run is carried out at 100° C. and completed in about 2½ hours. However, no ethylene oxide is included in the polymerization system. After polymerization, significant fouling is observed in the reactor and the product latex contains many agglomerates. Further, it is not possible to siphon product from the reactor as normally practiced in the process, due to severe plugging of the transfer tube.

Example 4

Following the procedure as outlined in Example 1 above, another vinylidene fluoride polymer product is prepared. The polymerization recipe is the same except that in this run, 0.5 ml. (about 0.4 part) isopropanol is also incorporated. The total reaction time is approximately 2¾ hours, with about 95% polymer yield. The MFI number of the finished polymer product is 27, while the average particle size is similar to the product of Example 1.

A dispersion of this polymer is prepared as described in Example 1. It exhibits the same viscosity and Hegman grind rating and coatings therefrom are similarly smooth, homogeneous and completely adherent. These coatings have a Gardner gloss rating of 65 at 60°.

Examples 5-8

A series of polymerization experiments are carried out in accordance with the process of this invention. In these runs, other peroxy initiators, both water-soluble and monomer-soluble types, are employed in place of β-hydroxyethyl tertiary butyl peroxide. In each instance, substantially liquid-full reactor conditions are maintained by additional hydrostatic pressure (2000-2500 p.s.i.g. operating pressure). Approximately 514 parts of monomer is utilized along with 5 parts of the fluorinated surfactant and 25 ml. of the 1% aqueous ethylene oxide solution. The results obtained with each initiator are listed in the following table together with the polymerization conditions employed.

TABLE 1

| Example | Initiator | Initiator wt. percent $CF_2=CH_2$ | Reaction temp., °C. | Reaction time, hrs. | Percent conversion | Reactor fouling |
|---|---|---|---|---|---|---|
| 5 | Disuccinic acid peroxide | 2.0 | 90 | 6 | 90 | Extremely bad. |
| 6 | Peroxymaleic acid | 3.0 | 100 | 3 | 0 | Do. |
| 7 | Tert.-butyl peroxypivalate | [1] 0.25 | 90 | 4½ | 30 | Do. |
| 8 | $H_2O_2$/sodium formaldehyde sulfoxylate | [2] 0.01/.06 | 50 | 5½ | 50 | Product is suspension—large agglomerates. |

[1] Pumped in as a 1.5% solution in mineral spirits slowly throughout the reaction.
[2] $H_2O_2$ solution prepared in 1,000 cc. water, pumped in at a rate of 1.0 ml./minute.

The above results show that utilization of the listed initiators rather than β-hydroxyethyl tertiary butyl peroxide in the process of this invention gives unsatisfactory results, e.g., bad reactor fouling, undesirable product and/or poor yields.

To further point out the merits of the process of this invention for preparing vinylidene fluoride polymers particularly adaptable for dispersion coating applications, dispersions of the polymer products obtained (Examples 5, 7 and 8) are prepared as set forth in Example 1. The consistency and fineness of grind of these dispersions and the properties of finished coatings therefrom are likewise similarly determined with the following results:

DISPERSION/COATING PROPERTIES

| Product of example | Hegman grind number | Zahn viscosity, seconds | Gardner gloss/60° | Appearance of coating |
|---|---|---|---|---|
| 5 | 7 | 6 | 2 | Dull, full of pinholes. |
| 7 | 1 | 2 | | Noncontinuous. |
| 8 | 4 | 8 | 9 | Discolored, uneven with pinholes. |

The dispersion prepared from the polymer prepared with disuccinic acid peroxide as initiator produces coatings which are dull and imperfect. The dispersions containing polymers made with tertiary-butyl peroxypivalate and the hydrogen peroxide/sodium formaldehyde sulfoxylate initiator system respectively produce finished coatings which are noncontinuous or uneven, discolored and full of pinholes.

Example 9

A vinylidene fluoride polymer is prepared in a 10-gallon stainless steel reactor at 90° C., utilizing the following polymerization recipe:

| | |
|---|---|
| Deionized water _____liters__ | 31 |
| $VF_2$ _____lbs__ | 13.19 |
| Ammonium perfluorooctanoate _____g__ | 56.0 |
| β-Hydroxyethyl tertiary butyl peroxide (86% solution in mineral spirits) _____g__ | 66.0 |
| Ethylene oxide _____g__ | 2.78 |
| Isopropanol _____g__ | 51.1 |

After reaching the polymerization temperature, approximately 7 liters of water are added during the run time of 4½ hours to maintain a reaction pressure of 2000 p.s.i.g. (substantially liquid-full reactor conditions). The reclaimed, finished polymer product (89.5% yield) has an average particle size of 0.5μ. It exhibits a MFI number of 61.1.

Example 10

Utilizing the same procedure and polymerization recipe as outlined in Example 9, a vinylidene fluoride polymer is obtained in 90% yield with a total run time of 4¾ hours. In this run, however, the amount utilized of isopropanol chain transfer agent is reduced to 39.5 g. The resulting polymer material, while similar in dispersion properties to the product of Example 8, is of higher average molecular weight, having an MFI number of 24.2.

Dispersions of the polymer products of Example 9 and of this example, prepared as previously described, have a Zahn G 5 viscosity of 7 Zahn-seconds and a Hegman grind number of over 8. Finished coatings from these dispersions are smooth, homogeneous and completely adherent materials. They exhibit a Gardner gloss rating of 67–68 at 60°.

Example 11

For comparison purposes, vinylidene fluoride was polymerized in a system maintained at an operating pressure less than 1500 p.s.i.g. In this run, the polymerization procedure utilized was the same as outlined in Example 1, except that only 454 parts of monomer; 5.0 parts of the initiator (71% solution in mineral spirits); 4.5 parts of fluorinated surfactant and 21.0 ml. of the 1% aqueous ethylene oxide solution were employed. Also, in an effort to prevent the reaction mixture from solidifying with increasing monomer conversion, 2000 ml. of deoxygenated, deionized water was charged initially to the reactor instead of the 1000 ml. water charge specified in Example 1. No water was added during the run to supply any hydrostatic pressure.

After all of the components were charged, the reaction mixture was heated to the polymerization temperature very slowly to minimize any localized overheating. The reaction was conducted at 100° C. for 5½ hours at an operating pressure of 1100–1150 p.s.i.g. as exerted by the monomer at this temperature. After an hour, the pressure started dropping significantly. During the last stages of the reaction, temperature control on the system was extremely difficult and the operating pressure dropped to 100 p.s.i.g.

After cooling, the reactor was opened and the polymerization mixture was found to be a thick, paste-like mass. This was scooped out and then further removed with water flushing. Build-up of polymer which was evident on the reactor wals, heating coil, etc., was likewise removed with repeated water flushing. The resulting reaction mixture resembled a suspension rather than a latex.

Although overall monomer conversion was fair (50%+), the polymer product contained many agglomerates and was of nonhomogeneous particle size and character.

From these results, it is concluded that the vinylidene fluoride polymerization process of the present invention is necessarily conducted at an operating pressure in excess of that exerted by the monomer in order to realize optimum polymer yields and to obtain desirable polymer product. Further, the process of this invention represents a commercially-feasible method to prepare vinylidene fluoride polymers. From this process, higher yields of product are obtained regardless of the reactor size since larger quantities of monomer can be charged in proportion to the water employed, thus producing product latices of higher solids content. From these latices, higher overall yields of particulate polymer product can be reclaimed per reaction.

It is to be understood that although the invention has been described with specific reference to particular embodiments thereof, it is not to be so limited, since changes and alterations therein may be made which are within the full intended scope of this invention as defined by the appended claims.

I claim:

1. A process for preparing a vinylidene fluoride homopolymer which comprises polymerizing at a temperature ranging from 80° C. to 110° C. and for a time period of from 0.5 hour to 6 hours vinylidene fluoride in an aqueous medium in the presence of (a) β-hydroxyethyl tertiary butyl peroxide as the water soluble initiator; (b) a lower alkylene oxide; and (c) a water-soluble fluorinated surfactant, while sustaining an operating pressure of 1500–5000 p.s.i.g. on the reaction by continuously applying hydrostatic pressure in excess of the monomer pressure.

2. The process of claim 1 wherein the β-hydroxyethyl tertiary butyl peroxide is employed in an amount ranging from about 0.2 to about 3 percent, by total weight of monomer.

3. The process of claim 1 wherein the lower alkylene oxide is ethylene oxide.

4. The process of claim 3 wherein the ethylene oxide is employed in an amount ranging from about 0.02% to 0.5%, based on the total monomer weight.

5. The process of claim 1 wherein the water-soluble fluorinated surfactant is employed in an amount ranging from 0.1% to 1.5%, by weight of the monomer.

6. The process of claim 1 which is conducted at a temperature of 90° C. to 105° C. for 1–5 hours, and at a reaction pressure of at least 2000 p.s.i.g.

7. The process of claim 1 wherein the polymerization reaction additionally contains a chain transfer agent.

8. The process of claim 7 wherein the chain transfer agent employed is isopropanol.

References Cited

UNITED STATES PATENTS 3,640,985    2/1972    Stevens _____ 260—92.1

HARRY WONG, Jr., Primary Examiner

U.S. Cl. X.R.

117—132, 161; 260—29.6, 32.2, 32.6, 41